July 3, 1928.
O. C. RITZ WOLLER
STEP PLATE
Filed May 27, 1925
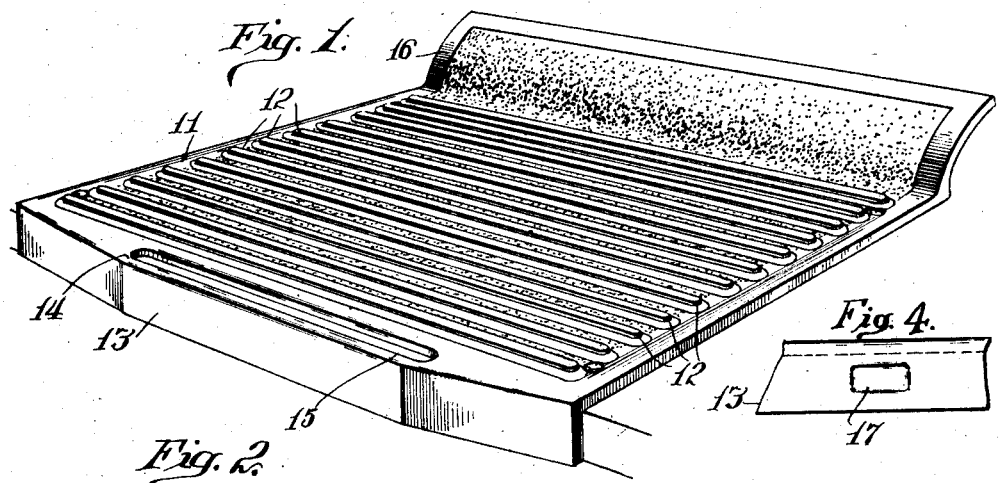
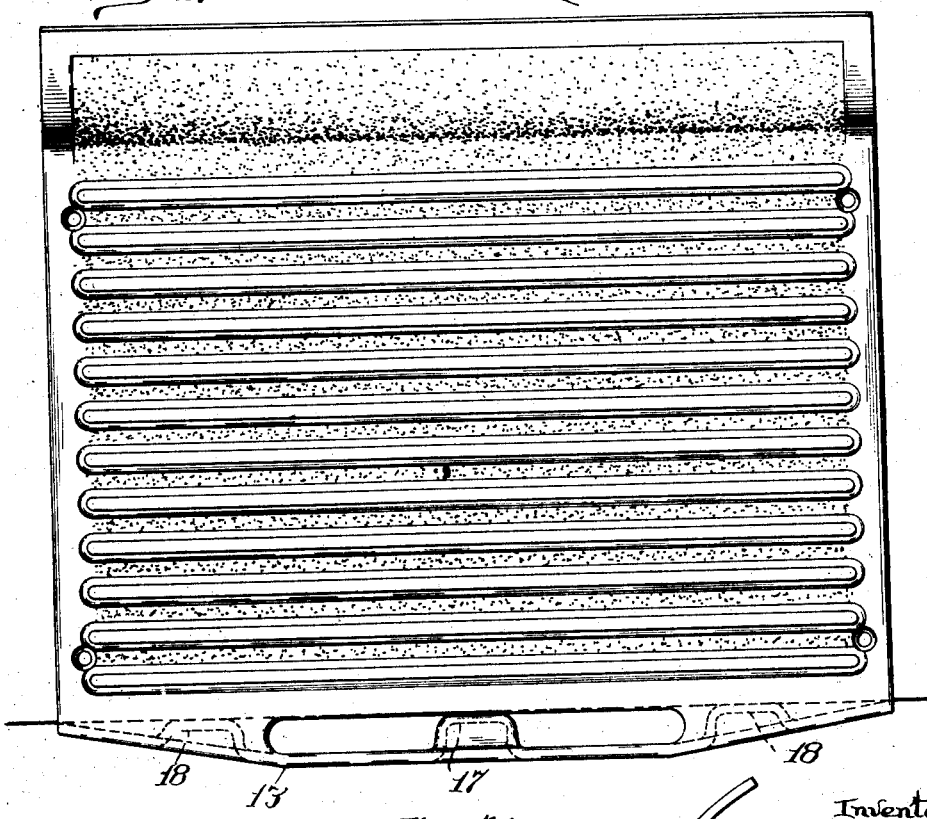
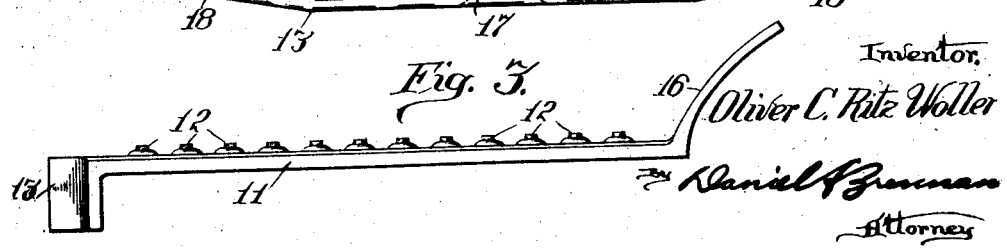

Patented July 3, 1928.

1,675,665

UNITED STATES PATENT OFFICE.

OLIVER C. RITZ WOLLER, OF CHICAGO, ILLINOIS.

STEP PLATE.

Application filed May 27, 1925. Serial No. 33,231.

This invention relates to step plates and particularly to a step plate provided with a riser tapered to take the blow from a curb or the like which the vehicle may strike in passing or coming to a stop, to reduce the impact caused thereby.

An object of the invention is to provide a step plate having a scraper along its outer edge arranged so that dirt in passing through the slot provided in the tread of the step plate will clear the running board and drop to the ground.

Another object of the invention is to provide a step plate having a tapered riser arranged to relieve the shock caused by the blow in striking a curb or the like, thus reducing the impact and preventing breakage.

Another object of the invention is to provide integral reenforcing means in a step plate comprising a scraper and a tread portion.

Another object of the invention is to provide a step plate reenforced at one end by a kick plate and at the opposite end by a riser all formed integral.

In the drawings illustrating a preferred embodiment of the invention:

Fig. 1 is a plan view of the step plate shown in perspective.

Fig. 2 is a plan view of a modification of the step plate shown in Figure 1.

Fig. 3 is an end view of the plate shown in Figure 1 and,

Fig. 4 is a fragmentary detailed view of Fig. 3 showing the reenforcing means.

The step plate comprises a tread portion 11 having reinforcing safety treads 12 spaced parallel with the inner edge and terminating a short distance from the longitudinal ends of the tread portion. Downwardly extending risers 13 project from the tread to form a contact surface with the running board and are tapered outwardly towards the center of the tread proper for a portion of their length, and extend to form a scraper portion 14 disposed parallel to the inner edge of the tread portion 11. The risers 13 extending from the transverse edges are thus formed within the longitudinal limits of the tread portion. The scraper portion 14 is spaced from the running board of the vehicle to which the step plate is adapted to be attached to form an opening 15 of less length than the length of the tread portion. Dirt engaged by the scraper is free to pass thru the opening 15 past the running board edge. The rear end of the tread 11 extends upwardly and inwardly forming a kick plate 16 of substantially arcuate cross section provided to prevent injury to the vehicle to which it is attached. Apertures in the tread portion are provided for the reception of fastening means which secure the step plate in desired position on the running board. It is to be noted that when a step plate of the present invention is attached to a running board of a vehicle and that vehicle happens to strike a curb or the like, the impact due to the blow will be greatly lessened due to the outwardly extending tread and riser being tapered and thus reduces breakage to a minimum caused in this way in these step plates.

The modification shown in Fig. 2 has a portion of the scraper 14 pressed inwardly as at 17 and a portion of the riser 13 pressed inwardly as at 18 to form a reenforcing and stiffening element.

I do not intend to be limited to the particular details herein shown and described, except, as limited in the claim as it will be obvious that the foregoing is merely an exemplary embodiment of the invention.

I claim:

A step plate including a tread portion adapted to be secured to a step and having a marginal depending flange overlying the edge of the step, said depending integral flange having the ends thereof disposed in inclined planes to form gradual risers for preventing objects catching thereon and the medial portion of said flange being spaced from and substantially parallel to the adjacent edges of the tread and step, to afford a scraper and a passage-way for dirt and the like, and means for reinforcing said risers and said scraper including abutments pressed inwardly from the body of said flanges and disposed in contact with the adjacent edge of the step intermediately of the respective risers and scraper portions.

In testimony whereof I affix my signature at 10 South La Salle Street, Chicago, Illinois.

OLIVER C. RITZ WOLLER.